United States Patent [19]
Warren et al.

[11] 3,710,107
[45] Jan. 9, 1973

[54] ATMOSPHERIC MONITOR BY MEANS OF CHEMILUMINESCENT REACTION

[75] Inventors: Gary J. Warren, Los Altos; Gordon L. Babcock, Menlo Park, both of Calif.

[73] Assignee: Radiation and Environmental Materials, Inc., Santa Monica, Calif.

[22] Filed: Jan. 25, 1971

[21] Appl. No.: 109,202

[52] U.S. Cl............250/71.5 R, 250/71 R, 23/230 R, 230/252 R
[51] Int. Cl..............................................G01n 31/00
[58] Field of Search..........250/71 R, 71.5 R, 83.3 IR, 250/435 R, 218; 128/1; 351/96, 51, 97; 23/230, 257; 350/3

[56] References Cited

UNITED STATES PATENTS 3,271,113   9/1966   Van Pul..............................250/71 R
3,574,064   4/1971   Binnings et al. .....................250/71 R Primary Examiner—Archie R. Borchelt
Attorney—Marvin E. Jacobs

[57] ABSTRACT

A continuous, gas phase chemiluminescent monitor is disclosed. Air is introduced into a reaction chamber through an elongated nozzle. A chemiluminescent reagent gas such as ethylene for detecting ozone or ozone for detecting nitrogen oxides is injected into an annular inlet surrounding the air nozzle. The gases mix within a mixing chamber at the end of the concentric nozzle and form a turbulent flowing mixture which exits through the orifice of the nozzle and reacts within the reaction chamber. A light detector such as a photomultiplier tube is disposed adjacent the chamber and the chemiluminescent output of the reaction is detected and the signal is amplified and recorded, preferably as a digital readout. The flow rate of reagent gas is controlled at the inlet while the flow rate of air is controlled by means of a vacuum pump attached to the outlet of the reaction chamber, preferably by a pump incorporating an electronically driven diaphragm.

12 Claims, 1 Drawing Figure

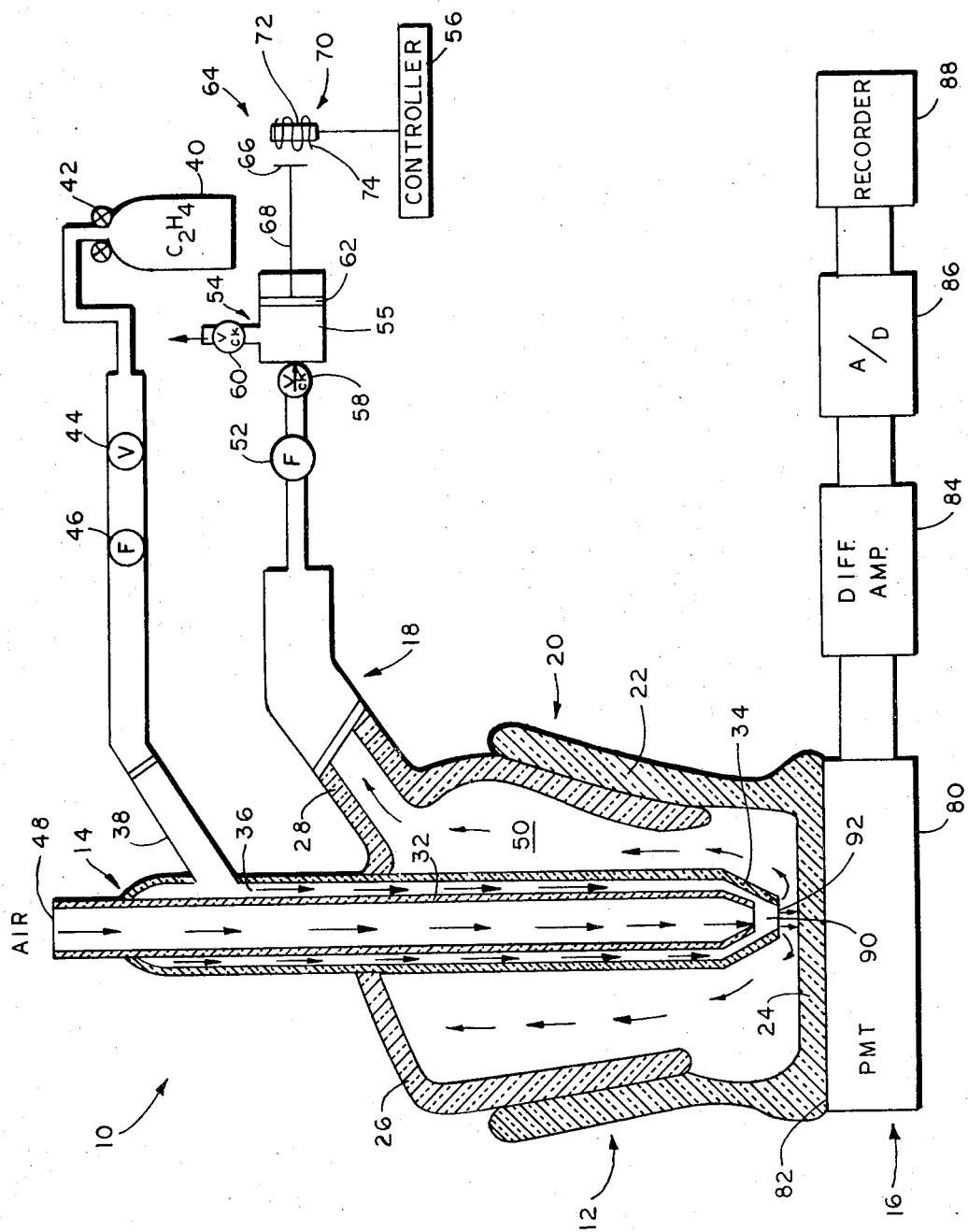

ATMOSPHERIC MONITOR BY MEANS OF CHEMILUMINESCENT REACTION

BACKGROUND OF THE INVENTION

1. Field of the Invention

The present invention relates to the chemiluminescent detection of specific air impurities and, more particularly to an efficient and accurate determination of the ozone content of atmospheric gases.

2. Description of the Prior Art

Ozone monitors currently in use for air pollution monitoring utilize the chemiluminescent reaction of ozone with dyes such as Rhodamine B and the potassium iodide reaction with ozone to form iodine. These techniques and instruments suffer from reduced sensitivity with time or interference by other oxidizing or reducing agents. For example, the reaction with potassium iodide to form iodine is not specific to ozone and the output of iodine will be depressed by reducing agents such as $SO_2$ or aided by oxidizing agents such as $NO_2$. Furthermore, the reagent materials such as Rhodamine B or potassium iodide require purification and processing before use.

SUMMARY OF THE INVENTION

The atmospheric gas monitor of the present invention is based on the continuous, chemiluminescent, gas-phase reaction between ozone and ethylene. This reaction measures ozone specifically even in the presence of other normally present oxidation and reducing agents such as $NO_2$, $SO_2$, $Cl_2$ etc. The reaction provides an almost instantaneous response to ozone. Furthermore, since the sensitive reagent material is being continuously replenished, there is no loss in sensitivity caused by consumption of reagent or reduction in the relative amount of reagent to atmospheric sample.

However, the reaction is quite sensitive to air flow rate and to a lesser degree, ethylene flow rate. Past efforts with monitors based on this reaction were not suitable since wide variations in light output were experienced with increasing or decreasing concentrations in the ethylene flow rate.

In accordance with the invention, a mixing-reaction chamber is provided that results in a stabilized light output which does not vary more than ±10 percent even when the ethylene flow rate is increased by a factor of two. The ozone monitor of the invention can directly utilize commercially available CP grade ethylene having a purity of about 99 percent.

In the monitor of the invention, the chemiluminescent reaction takes place in a reaction chamber having a radiation transparent end face coupled to a photomultiplier tube. The current signal produced in the photomultiplier tube is proportional to ozone concentration. At low levels of ozone measurement, the PMT dark current may cause significant errors and should be eliminated by an electronic subtracting or balancing technique, suitably by introducing an offset current into a differential amplifier.

The ozone and ethylene are introduced as separate streams and are efficiently mixed with turbulence adjacent the light sensitive face of the photomultiplier tube by joining the separate streams within an enclosed mixing head having a mixing chamber between the joining point of the streams and the exit orifice of the head. The turbulent mixture leaves the orifice and reacts with luminescence in front of the PMT.

The ethylene flow rate is adjusted upstream of the reaction chamber by conventional regulators, valves and flowmeters. The air flow rate is adjusted by controlled pulling of the reacted mixture through the exit port of the reaction chamber. Better precision and control has been experienced by the use of electronically driven and controlled pumping means.

The invention will now become better understood by reference to the following detailed description when considered in conjunction with the accompanying drawings.

BRIEF DESCRIPTION OF THE DRAWING

The FIGURE is a schematic view of an atmospheric monitor according to the invention.

DESCRIPTION OF THE PREFERRED EMBODIMENTS

Referring now to the FIGURE, the atmospheric monitor 10 generally comprises a chemiluminescent reaction cell 12, a gas inlet-mixing unit 14, an electrooptical measuring and indicating system 16 and an exhaust-flow control unit 18.

The mixing-reaction chamber is preferably constructed in two separable parts to provide a convenient means for opening the chamber for cleaning. The chamber can be constructed from a 50mm/50mm ground glass joint 20. The bottom or female portion 22 of the joint is closed by a radiation transparent disc 24, suitably formed of Pyrex. The gas inlet unit 14 is connected and sealed to the male portion 26 of the joint 20. A branch or arm 28 is also joined to the male portion of the reaction cell 12 for connection to the exhaust and flow control unit 18.

The gas inlet unit 14 is constructed of a pair of elongated concentric tubes 30, 32 forming a nozzle extending into the cell and terminating in a tip 34 adjacent and facing the disc 24. The annular space 36 between the tips forms the reagent gas injection inlet. An inlet branch 38 is attached to the outer tube 30 and is connected to a source of reagent gas, for example a pressurized cylinder 40 of ethylene gas through a regulator 42, needle valve 44 and flowmeter 46, suitably a rotometer.

Air is drawn into the inlet port 48 of the central air inlet tube by means of the controlled vacuum placed on the reaction chamber 50 by means of the exhaust-flow control unit 18. The unit 18 includes a flowmeter 52, pump 54 and pump controller 56. Though mechanical pumps are capable of operation for limited periods, it is difficult to choke these pumps to the very small flow rates necessary for the reliable operation of the monitor of the invention and the vanes of the pumps have limited reliability under these conditions of operation.

The critical air flow rate is reliably controlled without the necessity for needle or control valves, according to the invention, by the use of an electronic pump 54. The pump 54 comprises a pump chamber 55 having a unidirectional inlet check valve 58 and a unidirectional outlet check valve 60. A piston 62 is mounted within the chamber 56 and is reciprocated by an electronic oscillator 64. The oscillator can comprise a diaphragm 66 connected to the piston rod 68 and driven by a solenoid 70. The solenoid can comprise a bar magnet 72 surrounded by a coil 74. The controller 56 may include a potentiometer. On adjustment of the resistance of the potentiometer, the frequency of vibration of the diaphragm is regulated and the pumping action can be controlled very accurately. The electronic oscillator may take the form of a piezoelectric or electrorestrictive element connected to the piston or disposed within the chamber. The controller 56 may be a conventional frequency control device for these elements.

The electro-optical system includes a photomultiplier tube 80. The light sensitive face 82 of the tube 80 is applied to the disc 24 suitably by means of an optical grade of silicone grease. The dark current is introduced into a differential amplifier 84 which applies an offset current to the photomultiplier tube 80 to suppress and eliminate the background or noise signal. The light output signal from the photomultiplier 80, amplified in amplifier 84 is converted in an analog to digital converter 86 and the digital signal is recorded on recorder 88. The signal from converter 86 can be telemetered on line to a computer for data processing or recording and/or can be displayed by a four digit Nixie tube display optional printer.

The monitor is operated by actuating the pump 54 to draw air into the inlet 48, at a controlled rate as indicated on flowmeter 52. Regulator 42 and needle valve 46 are adjusted until a controlled stoichiometric excess of ethylene with respect to ozone is being injected into the annulus 36 as indicated on flowmeter 46. The air and ethylene streams merge and mix efficiently and turbulently within a mixing chamber 90 defined within the tip 34 and between the ends of tubes 30 and 32. The exhaust pressure created by the pumping action of pump 54 draws the mixture out of the orifice 92 and the mixture reacts with luminescence adjacent the light sensitive face 82 of the PMT 80.

It has further been discovered in accordance with the invention that for typical ozone concentrations experienced in ambient air and for an air flow of one liter per minute, the ethylene flow rate can be about 5–20 ml per minute, suitably 10 ml per minute. An increase in ethylene flow by a factor of two results in a change in light output of not more than 10 percent.

In a specific embodiment of the invention, described by way of illustration and not limitation, the cell 12 had a volume of about 100 ml. The outer tube 30 had a diameter of 10mm and the inner tube had a diameter of 6mm. The orifice opening was 2mm and was spaced about 6–7mm from the disc 24 and about 2–3mm from the tip of the inner tube 32 to define the enclosed mixing head 90. When the diaphragm 64 was oscillated at 150 cycles per second the air flow rate was about one liter per minute. The ethylene flow was adjusted to about 13 ml per minute and can then be ignored since at these conditions, a point of saturation is provided where with electronic control of air flow, the ethylene flow rate can vary within limits without a significant effect on light output.

The monitor is designed and is capable of continuous operation at atmospheric level. The monitor is capable of monitoring for ozone in the presence of $NO_2$, $SO_2$, $Cl_2$ and other substances which have traditionally interfered with the potassium iodide reaction. The ozone ethylene reaction is fast, dry and is specific for ozone. The monitor can be provided with a range of 0–200 pphm and a sensitivity of 0.01 pphm for atmospheric use or with higher ranges for industrial applications. Precision of measurement is ±1 percent. The associated electronics, cell and gas handling equipment are not complicated and can readily be adapted to stationary or portable models.

The monitor of the invention can also be utilized to monitor nitrogen oxides by introducing ozone through the annulus 36 which reacts with NO in the air with luminescence.

It is to be understood that only preferred embodiments of the invention have been described and that numerous substitutions, modifications and alterations are all permissible without departing from the spirit and scope of the invention as defined in the following claims.

What is claimed is:

1. A continuous, gas phase, chemiluminescent, atmospheric air monitor comprising in combination:

an elongated reaction chamber having an end wall containing at least one area transparent to characteristic chemiluminescent radiation;

an elongated concentric nozzle comprising an inner and outer tube defining a first inlet flow path within the inner tube and a separate flow path within the annulus between said tubes;

a mixing head connected to the lower ends of said tubes and having an outlet orifice exposed adjacent the inner face of said wall area;

a first continuous atmospheric air inlet means communicating with the upper outer end of one of said flow paths;

a second continuous chemiluminescent gas reagent inlet means communicating a source of said reagent with the other of said flow paths;

first flow control means provided in said second inlet means between said source and said second inlet;

reaction gas outlet means connected to said chamber containing second flow control means for controlling the flow of atmospheric air into said chamber;

withdrawal pump means including a pump chamber the inlet side of which is connected to said outlet means for forming a turbulent flowing mixture of said air and reagent gas within the mixing head which leaves the orifice and reacts with characteristic chemiluminescence within the chamber and for controllably pumping the reacted gases from the chamber; and electro-optical means having a radiation sensitive face disposed adjacent the obverse face of said wall area for developing a signal proportional to the concentration of a chemiluminescently reactive component of the flowing atmosphere.

2. A monitor according to claim 1 in which said electro-optical means includes a photomultiplier tube.

3. A monitor according to claim 1 in which said withdrawal pump means includes a pump chamber and electronic oscillating means for driving said pump chamber.

4. A monitor according to claim 3 in which said oscillating means comprises a diaphragm and a solenoid for oscillating said diaphragm.

5. A monitor according to claim 3 in which said flow control means includes electrical frequency control means connected to said oscillating means for controlling the frequency thereof.

6. A monitor according to claim 1 in which said first and second inlet means comprise a set of concentric elongated tubes and said mixing head is formed by the extension of the outer tube past the end of the inner tube to form an enclosed mixing chamber and outlet orifice.

7. A monitor according to claim 1 in which said reaction chamber is formed of a plurality of separable parts and a gas-tight joint for joining said parts.

8. A method of determining the quantity of ozone in the atmosphere comprising the steps of:
   continuously flowing a controlled supply of ethylene to a closed mixing head having an outlet orifice communicating with a reaction chamber;
   continuing flowing a separate supply of said atmosphere air to said mixing head;
   efficiently mixing said ethylene and atmosphere air within the head to form a turbulent mixture;
   reacting the ethylene and ozone of said continuously flowing mixture with characteristic chemilum-inescent radiation as it leaves said head;
   applying a controlled pulling pressure to the outlet to said chamber for controllably withdrawing said mixture from said chamber to control said separate atmospheric air flow rate; and
   electro-optically detecting said radiation to develop a signal indicative of ozone concentration of said atmospheric air.

9. A method according to claim 8 in which the ethylene flow rate is adjusted to about 5 to 20 ml per minute for an atmospheric flow rate of about one liter per minute.

10. A method according to claim 8 in which said mixture is controllably withdrawn from said chamber by controlling the frequency of oscillation of an electronic pump connected to said outlet.

11. A method according to claim 8 in which said ethylene is of reagent grade.

12. A method according to claim 8 in which said ethylene and atmosphere are introduced to said head in separate streams through the annular and central flow channels of an elongated concentric tube nozzle, said tubes terminating in an enclosed mixing head having an outlet orifice.

* * * * *